United States Patent
Segal et al.

(12) 
(10) Patent No.: US 6,298,573 B1
(45) Date of Patent: Oct. 9, 2001

(54) CENTERING DEVICE FOR A SAW BLADE

(75) Inventors: John M. Segal, Jasper; Russell E. Neukam, Huntingburg, both of IN (US)

(73) Assignee: North American Products Corporation, Jasper, IN (US)

( * ) Notice: Subject to any disclaimer, the term of this patent is extended or adjusted under 35 U.S.C. 154(b) by 0 days.

(21) Appl. No.: 09/301,041

(22) Filed: Apr. 28, 1999

(51) Int. Cl.[7] .................................................. B23Q 16/00
(52) U.S. Cl. ........................ 33/640; 33/520; 33/633; 33/642
(58) Field of Search .............................. 33/632, 633, 642, 33/644, 671, 672, 673, 520, 613, 626, 628, 634, 640, 641, 643; 76/112, 74; 269/48.1; 82/165, 146, 147

(56) References Cited

U.S. PATENT DOCUMENTS

| | | | |
|---|---|---|---|
| 29,375 | * | 7/1860 | Hinman .................................. 425/127 |
| 522,651 | * | 7/1894 | Cole ........................................... 81/4 |
| 575,469 | * | 1/1897 | Fancher ............................. 408/115 R |
| 1,336,311 | * | 4/1920 | Martin .................................... 408/16 |
| 1,846,787 | * | 2/1932 | Buchmuller ............................ 33/520 |
| 2,290,731 | * | 7/1942 | Blazer ..................................... 279/33 |
| 2,541,605 | * | 2/1951 | Ohlsson ................................. 269/266 |
| 3,156,480 | * | 11/1964 | Wuesthoff ............................. 279/119 |
| 3,204,493 | * | 9/1965 | Severdia ................................. 408/97 |
| 3,221,787 | * | 12/1965 | Hitt .................................... 144/209.1 |
| 3,762,057 | * | 10/1973 | Kaifesh ................................... 33/794 |
| 4,034,786 | * | 7/1977 | Feldmann et al. ...................... 157/18 |
| 5,052,254 | * | 10/1991 | Goins ..................................... 82/152 |
| 5,069,096 | * | 12/1991 | Desrosiers ............................. 82/151 |
| 5,556,085 | * | 9/1996 | Cyr ......................................... 269/75 |
| 5,848,479 | * | 12/1998 | MacIndoe ............................. 33/542 |

\* cited by examiner

Primary Examiner—Diego Gutierrez
Assistant Examiner—R. Alexander Smith
(74) Attorney, Agent, or Firm—Barnes & Thornburg

(57) ABSTRACT

A device for centering tools, such as saw blades, rotary cutters and the like which are circular and which have bores of different sizes, on processing machines such that they can be positioned about their center axes. The device includes a mounting plate adapted to be attached to such a machine, a first and second bearings on the plate, and a third bearing mounted for movement on the plate selectively toward or away from the first and second bearings. The first, second and third bearings being engagable with the bore of the blade such that the bore is centered on the machine and the blade is rotatable about its center axis.

8 Claims, 5 Drawing Sheets

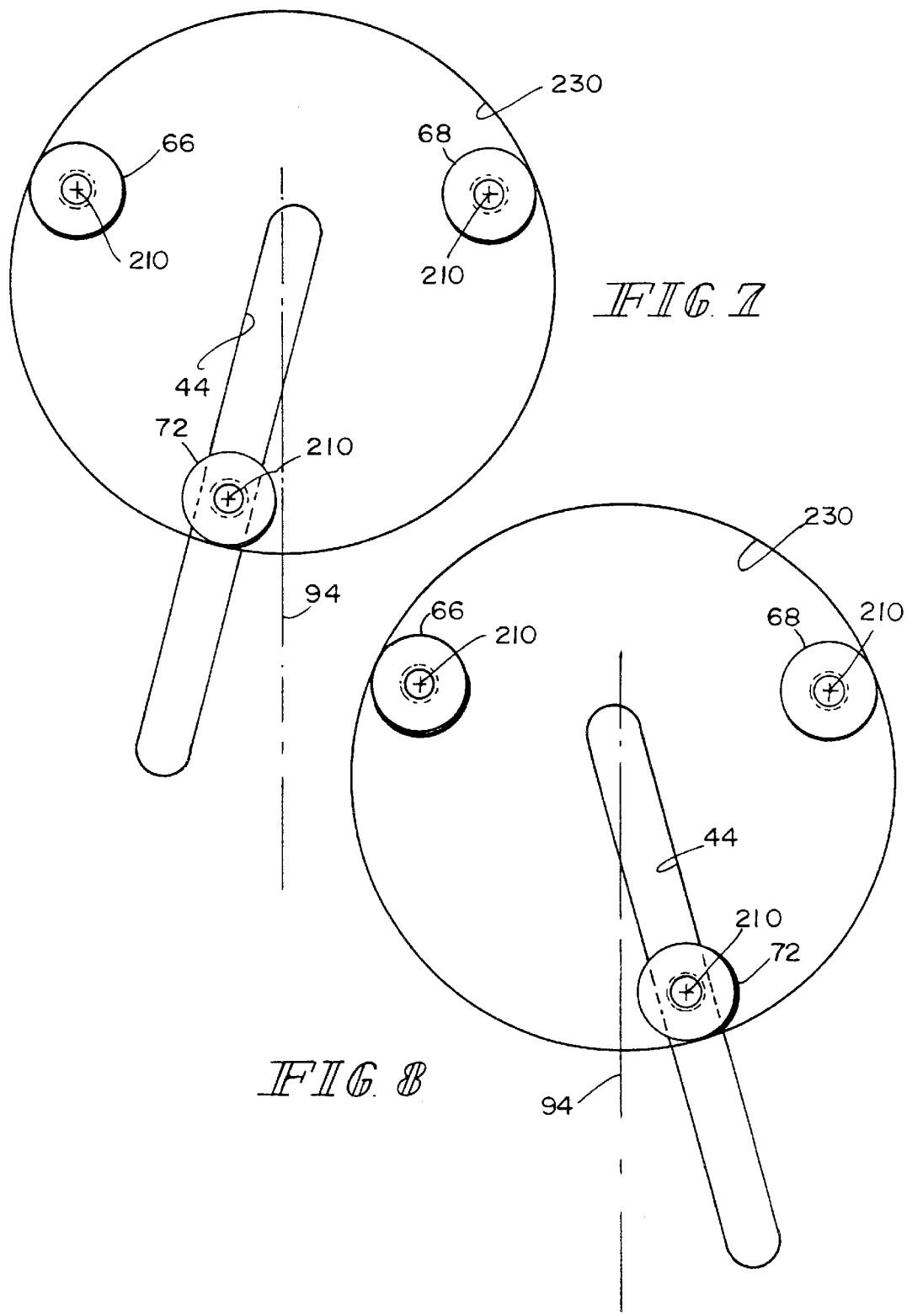

CENTERING DEVICE FOR A SAW BLADE

TECHNICAL FIELD

The present invention relates to a device for centering tools, such as saw blades, rotary cutters and the like which are circular and which have bores of different sizes, on processing machines such that they can be positioned about their center axes. More particularly, the present invention relates to a saw blade centering device having a mounting plate adapted to be attached to such a machine, a first and second bearings on the plate, and a third bearing mounted for movement on the plate toward and away from the first and second bearings. The first, second, and third bearings are engageable with the bore of the blade such that the bore is centered on the machine and the blade is rotatable about its center axis.

BACKGROUND ART

It is well known in the art that cutting tools such as industrial saw blades are provided with center bores (openings) having a variety of sizes. In order to sharpen such tools, it is necessary to position them on machines like grinders such that they are Orotatable about their true center axes. This is commonly handled in shops that process (sharpen) such saw blades by providing, with each machine, a rather large quantity of bushings for selective trial in the saw blade to be finished. While this approach is commonly used, it is difficult and time consuming to find the right bushing to center each saw blade brought to the machine.

Some machinists have provided rather complex mechanisms comprising three jaws and a mechanism for moving the jaws radially outwardly and inwardly selectively to fit a blade. These mechanisms, however, are rather complex and are difficult to use for a wide range of bore sizes.

The device of the present invention is primarily concerned with centering saw blades having different bore sizes on a processing machine. The centering device comprises a mounting plate to be placed on a processing machine having a first, a second, and a third bearing. The third bearing is movable away from or toward the first and second bearing to tighten against the saw blade bore centering the blade onto the grinder movable about the center axis of the blade.

SUMMARY OF THE INVENTION

According to other features, characteristics, embodiments and alternatives of the present invention which will become apparent as the description thereof proceeds below, the present invention provides a device for centering tools, such as saw blades, rotary cutters and the like which are circular and which have bores of different sizes, on processing machines such that they can be positioned about their center axes.

According to one embodiment of the invention, the centering device includes a mounting plate to be placed on a processing machine such as a saw blade grinder. The plate has a first, a second, and a third bearing that engage the bore of the blade. The third bearing is movable away from or toward the first and second bearing to tighten against the saw blade bore pulling it snugly against the first and second bearing. The saw blade is then centered on the grinder movable about the center axis of the blade and the bore. Each tooth of the saw blade can then be presented to a grinding wheel or other cutting device such that each tooth will be finished relative to the true center of the blade.

In a further illustrative embodiment of the present invention, the third movable bearing may be movable along an inclined angle relative to the center line of the centering device. Positioning the bearing at some relative inclination to the center line may allow the bearing to achieve better centering and holding characteristics to the bore. This range of inclination may extend to and exceed 15° depending on the size of the cutting tool bore.

According to further embodiment of the invention wherein the center bore of the cutting tool includes a keyway, the device includes a bridging bearing fitted on the first and second bearing and having a circular outer peripheral edge. Another bridging bearing attaches to the third bearing also having a circular outer peripheral edge. The bore of the saw blade having the keyway engages and is movable about the peripheral edges of the bridging bearings. This smooth circular outer surface will permit the keyway to be moved about the axis of the saw blade smoothly and still control the movement about the center of the blade. The bearings will accommodate most keyways of any size and configuration.

BRIEF DESCRIPTION OF DRAWINGS

The present invention will be described hereafter with reference to the attached drawings which are given as non-limiting examples only, in which:

FIG. 7 is a front view of an embodiment of the present invention having a pair of bearings in fixed relation to the third bearing that is movable along a line which is at an angle from the center line.

FIG. 8 is a front view of the embodiment of the present invention from FIG. 7 showing a greater angle of the movement of the third bearing in relation to the center line.

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION OF THE INVENTION

Figure 1:
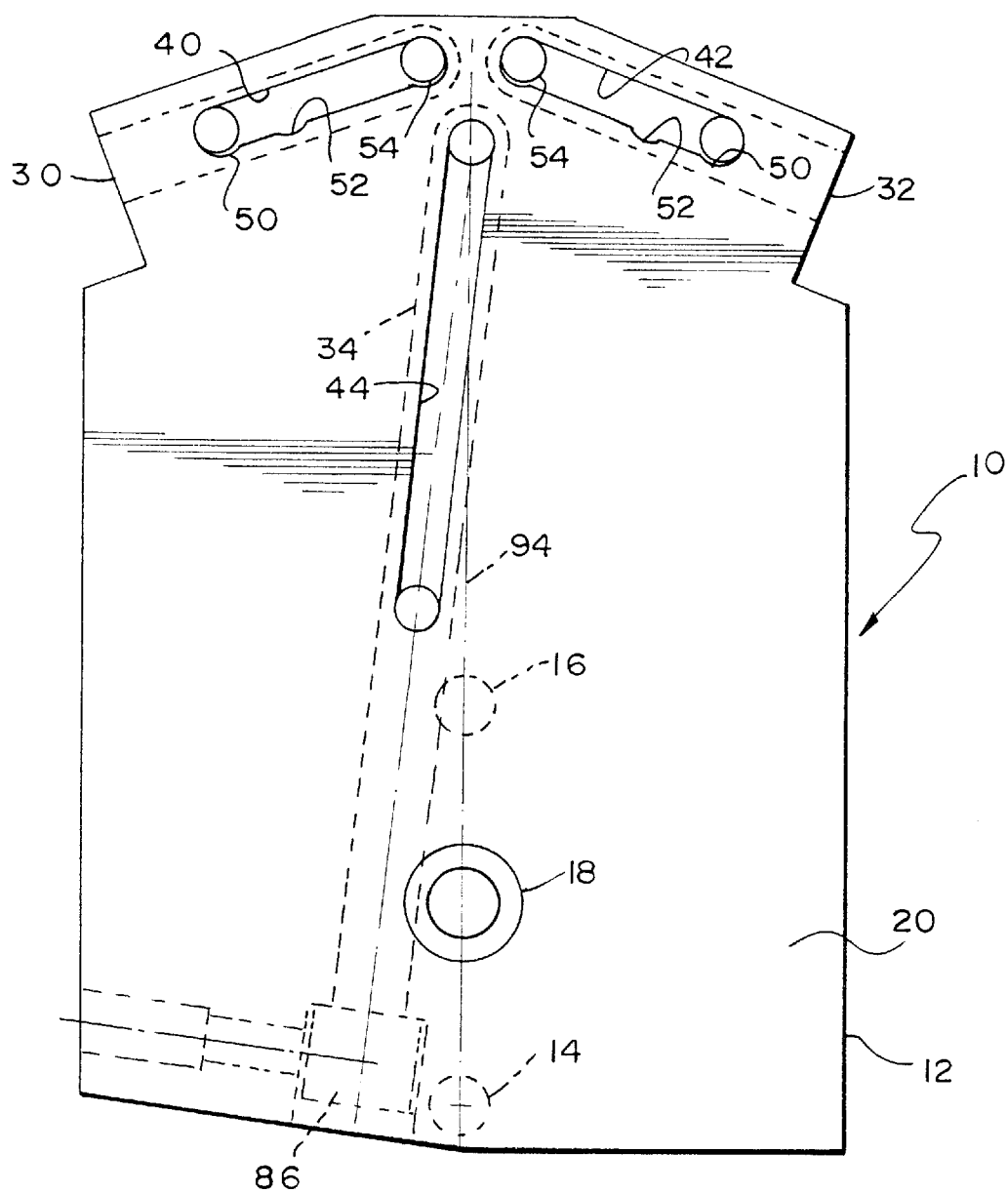
FIG. 1 is a front elevation view of the centering device embodying the present invention showing a mounting plate having slots and centering holes.
Figure 2:
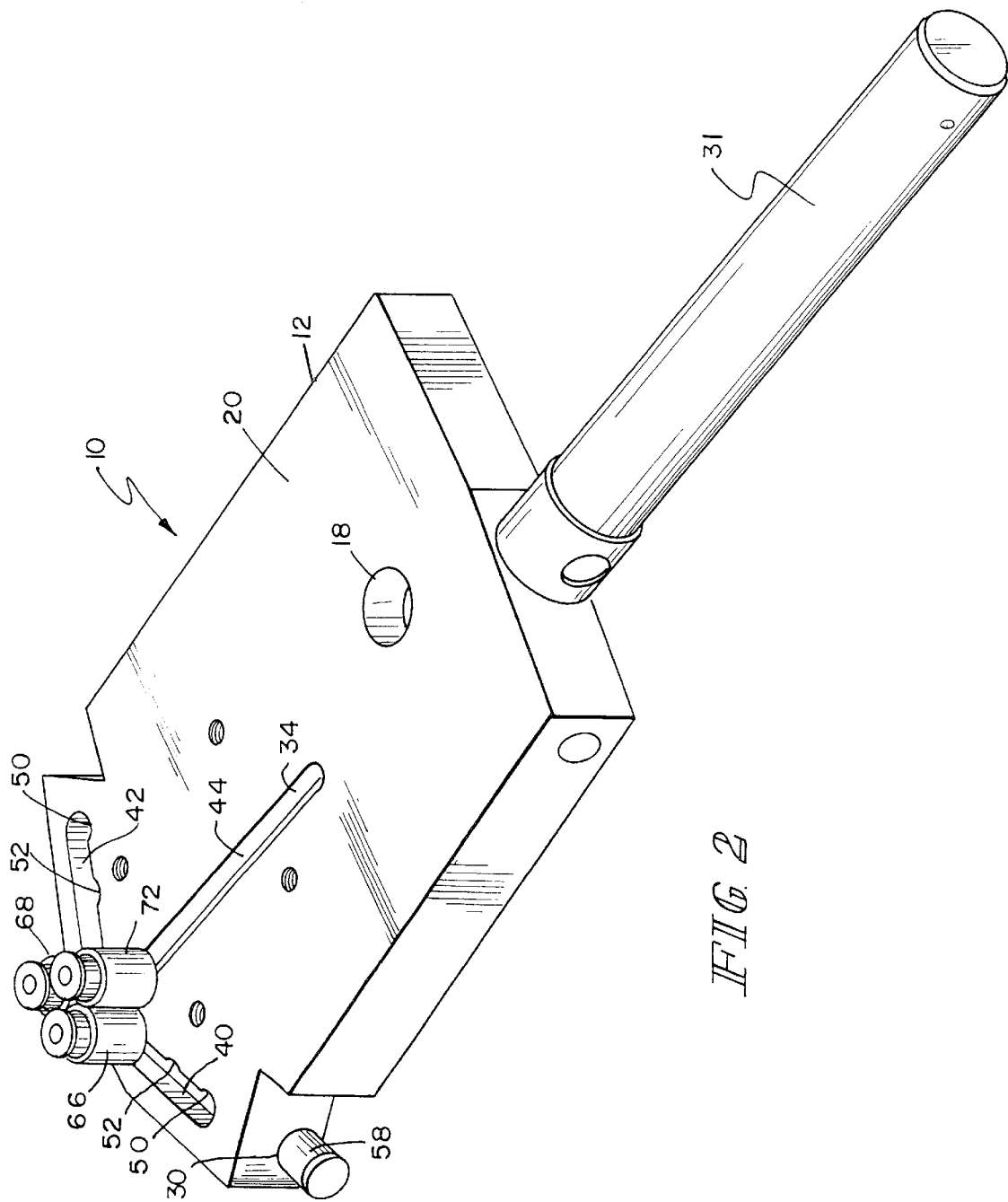
FIG. 2 is a left-side perspective view of the centering device embodying the present invention showing a mounting plate having slots and centering holes, a rod for housing an air cylinder, bearing rods and bearings.

The present invention is directed to a centering device 10 which is proportioned and designed to be mounted on a machine for processing circular tools such as saw blades having center bores. Such a machine may be, for example, a grinder used to sharpen industrial saw blades. Such grinders typically comprise a support upon which a saw blade is placed and indexed about its axis on a bushing such that each tooth can be sharpened or otherwise finished. Such machines typically have a single upwardly or outwardly extending bearing post although industrial saw blades are provided with a wide variety of bore diameters ranging from, for example, 1 inch up to 5.5 inches in diameter. Each such machine is typically provided with a plurality of bushings having an inner diameter which will fit the bearing post on the machine and a wide range of outer diameters which will fit typical bore diameters in saw blades. It will be appreciated that the operator of the machine must sort through a multitude of bushings to find an appropriate bushing. Quite often, for individual saw blades, a separate bushing will have to be made at some considerable time and expense. It will also be appreciated that some machines have horizontal (upwardly facing) work surfaces such that the blades are horizontally oriented. Conversely, other machines have vertically (laterally facing) work surfaces such that the blades are vertically oriented.

Device 10, shown in FIGS. 1–8, is provided to replace the multitude of bushings. Note that like reference numerals have been used for corresponding structures between the various embodiments. Device 10 comprises a mounting plate having a pair of dowel pin locating holes 14, 16 on opposite sides of a counter bore mounting hole 18. The arrangement for these dowel holes 14 and 16, and counter bore hole 18 is typical for such aforementioned blade processing machines (not shown). Plate 12 can be mounted on the machine having a pair of spaced apart, upstanding dowel pins and a threaded opening for receiving a bolt which extends through counter bore hole 18 firmly to secure plate 12 to the machine. The upper surface 20 of plate 12 becomes a part of the support surface upon which a circular and flat saw blade rests.

In the illustrative embodiment, plate 12 is provided with three intersecting cylindrical bores 30, 32 and 34, the axes of which may all lie in a common plane parallel to surface 20 of plate 12. (See FIG. 1.) Slots 40, 42 and 44 are milled in plate 12 as illustrated in FIG. 1 to open into the bores 30, 32 and 34. In this embodiment the width of slots 40, 42 and 44 are less than the diameter of bores 30, 32 and 34. This maintains bearing rods 58, and 70 (see FIGS. 2, 4 and 5) within the bores. It is appreciated, however, that device 10 does not necessarily require plate 12. Device 10 may illustratively be made an integral part of a saw blade grinding machine or the like.

Two slots 40, 42 have outer enlargements 50, intermediate enlargements 52, and innermost enlargements 54 which serve as locators for the selectively fixed bearings of the present invention. Specifically, in the illustrative embodiment, each of bores 30 and 32 receives cylindrical bearing rod 58 best seen in FIG. 2. Cylindrical bearing rods 58 are drilled and tapped to receive a threaded mounting bolt as indicated at 60. Such rods 58 may be, for example, 0.375 inch in diameter and bores 30 and 32 may be 0.377 inch in diameter such that the rods can rotate about their axes and slide along their axes in bores 30 and 32. The drilled and tapped holes 60 in rods 58 are utilized to mount ball bearings 66 and 68 (see FIGS. 2 and 3) onto bearing rods 58. It will be appreciated that, after bearing rods 58 are inserted into the bores 30 and 32, bearings 66 and 68 are mounted on the rods by threading a machine bolt into the openings 60. In this illustrative embodiment as best shown in FIGS. 2 and 3*a–c*, circular enlargements in slots 40 and 42, permit selectively positioning bearings 66 and 68 from their innermost fixed positions 54 to their intermediate fixed positions 52 and then outwardly to their outermost positions 50. Slots 40 and 42 are configured, and enlargements 50, 52, and 54 are sized, such that each bearing rod 58 can be rotated in a direction away from slot 44 a small amount, therefore, permitting shifting of bearings 66 and 68 selectively between outermost positions 50 and innermost positions 54 defined by enlargements 50, 52 and 54.

Figure 5:
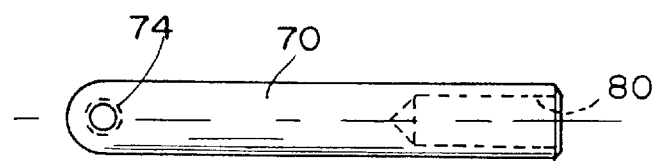
FIG. 5 is a top view of a movable bearing rod for use in conjunction with a pressure source according to one embodiment of the present invention shown in FIG. 1.

A movable bearing rod 70 is provided for reciprocation in bore 34, this rod being depicted in FIG. 5. A similar bearing 72 is secured to bearing rod 70 by a bolt in a tapped opening 74 movable 72 moves within elongated slot 44 toward and away from bearings 66 and 68 as rod 70 is reciprocated in bore 34. The extent of movement of bearing 72, of course, is limited by the extent of slot 44. The illustrative bearing rod 70 is also provided with a drilled and tapped opening 80. Drilled and tapped opening 80 engages the threaded end of a piston inside air cylinder 31 (see FIG. 2) causing bearing rod 70 to move in and out of air cylinder 31 that is attached to plate 12 at bore 86 (see FIG. 1).

Figure 3A:
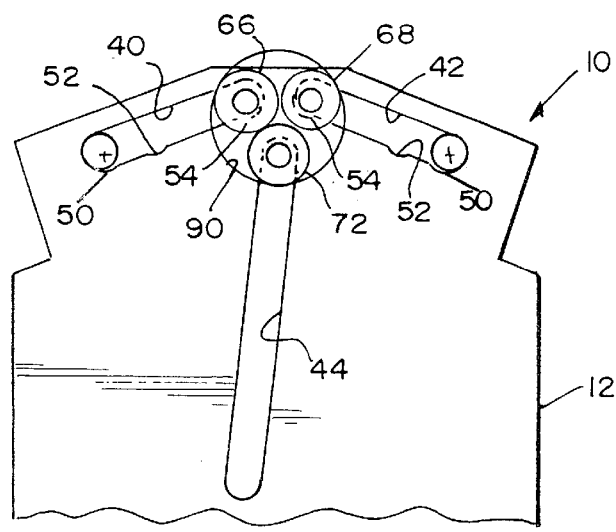
FIGS. 3a–c is a series of three front views of the centering device from FIG. 1 showing how movement of the bearings allows the centering device to accommodate a variety of bore sizes.
Figure 3B:
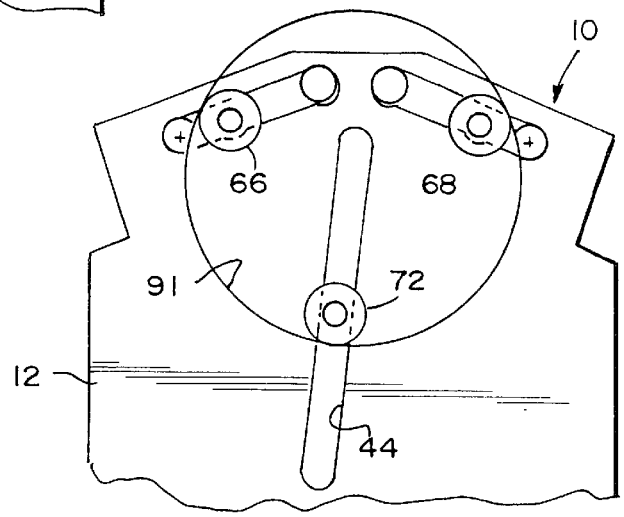
Figure 3C:
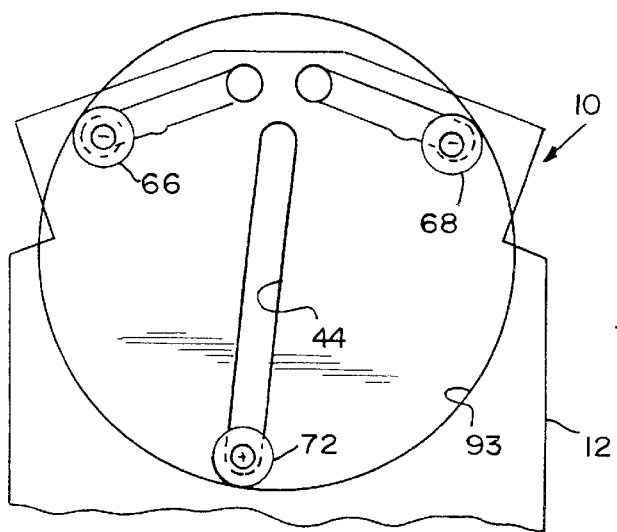
Figure 4:
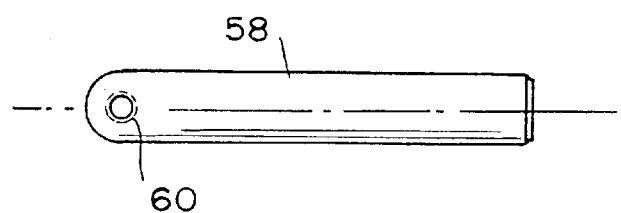
FIG. 4 is a top view of a bearing rod having an opening according to one embodiment of the present invention shown in FIG. 1.

In the illustrative embodiment, the air cylinder or other such mechanism is used to move bearing 72 along slot 44, away from or toward bearings 66 and 68, to hold a saw blade in its centered position, depending on the sizes of the saw blade bore. FIGS. 3*a–c* depicts three views of device 10 showing bearings 66, 68, 70 in different extended positions for centering illustratively three different sizes of bores 90, 91, and 93. If, for example, bearings 66 and 68, 72 have an outer diameter of 7/16 inch or smaller, they will fit, as depicted in FIG. 3*a*, within a one inch diameter bore when the centers of bearings 66 and 68 are separated by 0.500 inch. With bearings 66 and 68 in their innermost positions 54 and bearing 72 in its innermost position 64 at the upper end of slot 44 shown in FIG. 1, a one inch diameter bore saw blade can fit over the three bearings which have a 7/16 inch diameter. The saw blade can then be held securely by moving bearing 72 in the direction of slot 44 away from bearings 66 and 68 by the movement of rod 70. (See FIGS. 3*b* and *c*.) Bearings 66 and 68, and 72 rotatably cooperate with bore 90 shown in FIG. 3*a*, 91 shown in FIG. 3*b*, and 93 shown in FIG. 3*c*. The saw blade can then be moved about its true center such that each tooth on the saw blade can be accurately ground or otherwise finished relative to that center location.

It will be appreciated looking at FIG. 1 that slot 44 may be inclined at an angle relative to a centerline 94 of plate 12. It has been determined that better centering and holding may be achieved when slot 44 and bore 34 are at an angle relative to the center line 94. Centerline 94 is perpendicular to a centerline 104 between the axes of bearings 66 and 68. This inclination of bore 34 and slot 44 may be anywhere from, for example, 2° to 10°. It has been found that the angle may preferably be from 3° up to 8° for most applications and more preferably in the range of 5° to 6° for many saw tooth grinding applications. (As discussed hereinafter, for larger blades on a vertical machine, this inclination may be up to 15° or more.) It is believed that this range of angles works better because, when the saw blade is indexed about its center for sharpening purposes, it is moved by engaging the outer periphery of the saw blade to advance the blade to the next tooth for processing. The forces from this advancement is typically tangential to the saw blade. Also typically, a magnet is used to hold the body of the saw blade downwardly on the machine (not shown). The magnet is located between the center of the saw blade and its outer periphery. Such a tangential force which would typically be counterclockwise as viewed in FIGS. 1 and 3 might tend to move the blade from secure engagement with the bearings 66 and 68. It is appreciated, however, that the saw blades can be held with three bearings 66, 68 and 72 starting 120° apart and with the bearing 72 moving away from the bearings 66 and 68 along a line which is perpendicular to the line which joins the center axes of bearings 66 and 68.

It will be appreciated that the bearings 66 and 68 may be selectively positioned in their fixed positions simply by holding such bearings on bolts which are threaded into tapped locations on the plate 12. Any number of such mechanical arrangements may be used for selectively locating bearings 66 and 68 to new fixed positions. It has been found that cylindrical bearing rods 58 received in bores 30 and 32 are much more efficient because the bearings can be moved out of engagement with the enlargements 50, 52 and 54 by rotating the rods 58 slightly upwardly (as viewed in FIG. 1) and then shifting the rods axially between their respective positions as previously discussed. It will also be appreciated that such bearings 66 and 68 may be carried on slide members which are slidably received in tracks formed in mounting plate 12.

Similarly, movable bearing 72 may be mounted on plate 12 for movement using a variety of techniques. The objective is to have bearing 72 be freely selectively movable away from or toward bearings 66 and 68 to engage the bore of the saw blade being processed. The air cylinder movement is deemed to be practical because it can be adjusted to provide the proper holding force for the bearing 72. It will be appreciated that any variety of power sources capable of causing a reciprocating movement may work in place of the air cylinder. In addition, it will be appreciated that, for larger saw blades with larger bores, the bearings 66 and 68 may be separated to their intermediate positions 52 or even to their outermost positions 50.

The centering device of the present invention may be a plate similar to plate 12 which is approximately 4 inches wide (see FIG. 1) and 6 inches long. Plate 12 may be 0.625 inches thick. Yet, this small or relatively small mounting plate with ball bearings 66, 68 and 72 which are about 7⁄16 inch in diameter can accommodate a saw blade bore size ranging from 1 inch up to 3⅝ inches. (See FIGS. 3*a–c*.) With the bearings 66 and 68 in their outermost positions 50, the axes of the bearings will be 2 ⅝ inches apart. Slot 44 may permit bearing 72 to travel illustratively up to 2.5 inches. Such an illustrative mounting plate may then accommodate a saw blade having a bore diameter of 3⅝ inches.

In a further embodiment bearings 66 and 68 may be rigidly held in a fixed position, as shown in FIG. 7, with only bearing 72 movable along slot 44. This illustrative embodiment is particularly suited to centering large saw blade or tool bores up to 5½ inches in diameter. For example, bearings 66 and 68 may be 30 mm in diameter each and spaced apart about 1.81 inches from each of bearing's 66 and 68 center 210 (noting that FIG. 7 is not drawn to scale). Bearing 72 is about 24 mm in diameter and has a range of movement toward and away from bearings 66 and 68 of about 2½ inches. It will be appreciated looking at FIG. 7 that slot 44 may be inclined at an angle relative to a centerline 94. It may be preferable that better centering and holding may be achieved when slot 44 and bore 34 are at an angle relative to the center line 94 for the reasons previously discussed. This inclination of slot 44 may preferably be 6° from centerline 94. It will also be appreciated that this embodiment is particularly adapted for horizontal mounting and for use on an AKE brand grinder machine. It will also be appreciated that the fixed center-to-center dimension of 1.8100 inches between bearings 66 and 68 may be fixed at any selective spacing for use with various other brands of horizontal mounting grinder machines.

In a still further embodiment, bearings 66 and 68 may be rigidly held in a fixed position, as shown in FIG. 8, specifically for vertical mounting and use on a Vollmer brand grinder machine. Illustratively, bearings 66 and 68 are each 28 mm in diameter while bearing 72 is 30 mm in diameter (noting that FIG. 8 is also not drawn to scale). Furthermore, bearing 72 has a range of movement toward and away from bearings 66 and 68 of about 4 inches. Bearings 66 and 68 are spaced apart about 28 mm from each of bearing's, 66 and 68 center 210. It is preferable that an incline relative to centerline 94, as shown in FIG. 8, of about 15° ensures that bore 230 will remain in contact with bearings 66 and 68 when the blade is indexed (rotated about its center axis). This illustrative embodiment is particularly suited to centering large and heavy saw blade or tool bores up to 5½ inches in diameter. It will also be appreciated that the fixed center-to-center dimension of 24 mm between bearings 66 and 68 may be fixed at any selective spacing for use with various other brands of vertical mounting grinder machines.

Figure 6:
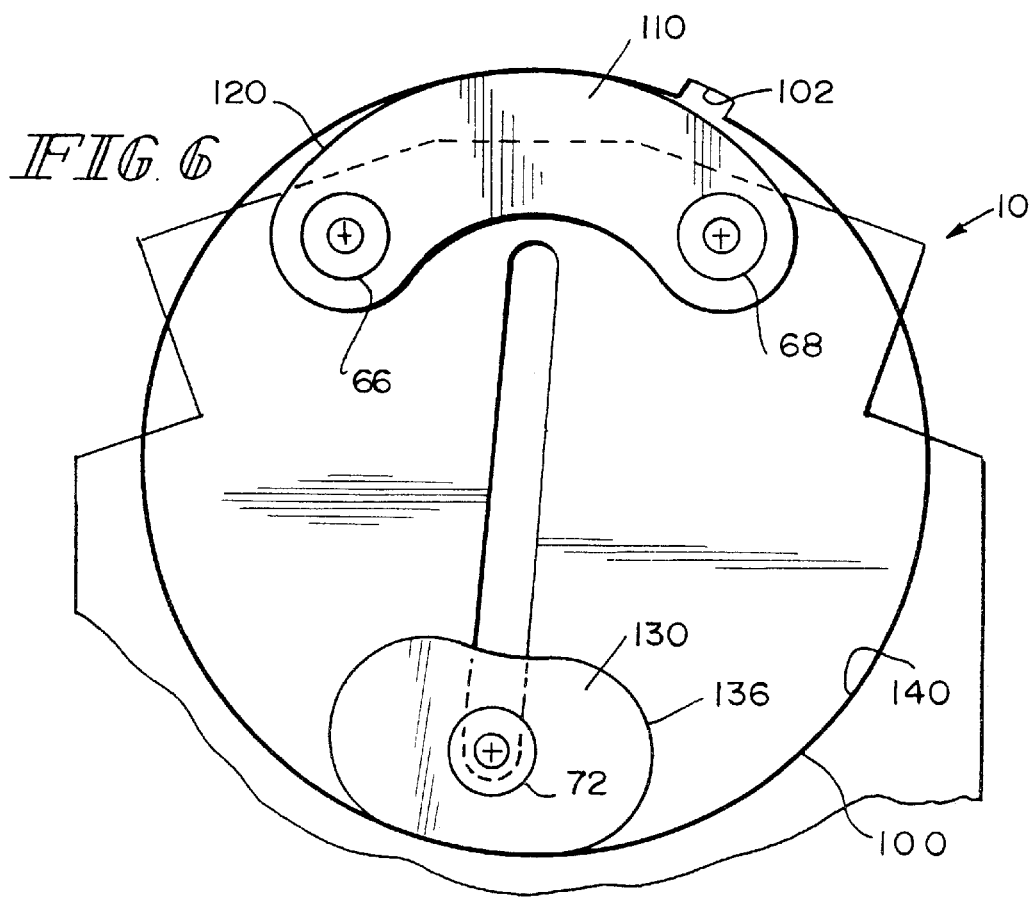
FIG. 6 is a front perspective view of another embodiment of the present invention showing a saw blade bore having a keyway, and a pair of bridging bearings.

As depicted in FIG. 6, some saw blades may have a bore 100 with a conventional keyway 102. Because keyway 102 may not engage bearings 66, 68 and 72 properly to locate the true center of bore 100, the present invention contemplates a bridging bearing 110 fitting downwardly over bearings 66 and 68. This bridging bearing is made to have a circular outer peripheral edge 120 to engage inner diameter 140 of bore 100 of the saw blade in the space between bearings 66 and 68. This smooth circular outer surface will permit the keyway 102 to be moved about the axis of the saw blade smoothly and still control the movement about the center of the blade. A smaller movable bridging bearing 130 is mounted over movable bearing 72 to provide a circular engaging surface 136 which engages inner diameter 140 of bore 100 of the saw blade.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the following claims.

What is claimed is:

1. A device for centering a circular cutting tool on a machine, the tool having a bore, the device comprising:

a mounting plate adapted to be attached to the machine to support the tool and to present the tool to a processing element;

first and second bearings on the plate; and a third bearing mounted for movement on the plate selectively toward and away from the first and second bearings so that the first, second and third bearings are engagable with the bore of the tool and the tool is centered on the machine when the third bearing is moved from the first and second bearing securely pulling the tool bore against the first and second bearing, whereby the tool is then rotatable about its center axis, wherein the third bearing is selectively movable toward and away from the first and second bearing along a line which is at an angle relative to a first reference line which is perpendicular to a common centerline through the axes of the first and second bearings.

2. The device of claim 1, wherein the third bearing is carried on a bearing rod mounted for sliding movement, and further comprising an actuator for moving the rod selectively toward and away from the first and second bearings.

3. A device for centering a circular cutting tool on a machine, the tool having a bore, the device comprising:

first, second and third bearings positioned to engage the bore, the first and second bearings being selectively spaced apart and held in fixed relative positions;

the third bearing being movable away from the first and second bearings to secure the bore against the first and second bearings wherein the third bearing is carried on a bearing rod mounted for sliding movement; and an actuator for moving the rod toward and away from the first and second bearings, wherein the bearing rod is inclined at an angle from 2° to 15° relative to a line which is perpendicular to a line which joins center axes of the first and second bearings.

4. The device of claim 3, wherein the bearing rod is inclined at an angle from 3° to 8° relative to the line which is perpendicular to the line which joins the center axes of the first and second bearings.

5. A device for centering a circular cutting tool on a machine, the tool having a bore, the device comprising:

first, second and third bearings positioned to engage the bore, the first and second bearings being selectively spaced apart and held in fixed relative positions; and the third bearing being movable away from the first and second bearings to secure the bore against the first and second bearings, wherein the device can be used with a center bore of the cutting tool having a keyway, the device also comprising a bridging bearing fitted on the first and second bearings, the bridging bearing having a circular outer peripheral edge, and an additional bridging bearing attached to the third bearing, the additional bridging bearing also having a circular outer peripheral edge, the bridging bearings configured to rotatably engage the center bore to permit rotation of the tool along its axis.

6. A device for centering a circular cutting tool on a machine, the tool having a bore, the device comprising:

first, second and third bearings positioned to engage the bore, the first and second bearings being selectively spaced apart and held in fixed relative positions;

the third bearing being movable away from the first and second bearings to secure the bore against the first and second bearings; and a bridging bearing associated with the first and second bearings to provide an outer edge for engaging the center bore of such a tool, and an additional bridging bearing associated with the third bearing to provide an outer edge for engaging the center bore of such a tool.

7. The device of claim 6, wherein the outer edges of the bridging bearings are peripheral outer edges to engage the center bore.

8. A device for use in combination with a machine, the device centering a circular cutting tool having a bore on the machine, the device comprising:

first and second bearings mounted on the machine; and a third bearing mounted for movement relative to the machine selectively toward and away from the first and second bearings such that the first, second and third bearings are engagable with the bore of the tool thereby centering the tool on the machine when the third bearing is moved from the first and second bearings securely pulling the tool bore against the first and second bearings, whereby the tool is then rotatable about its center axis, wherein the third bearing is angled laterally up to 15 degrees relative to a line perpendicular to a line extending through the centers of the first and second bearings.

* * * * *